United States Patent [19]

Lao

[11] 4,292,659
[45] Sep. 29, 1981

[54] PRESSURE SENSING CAPACITIVE TRANSDUCER

[75] Inventor: Binneg Y. Lao, West Bloomfield, Mich.

[73] Assignee: The Bendix Corporation, Southfield, Mich.

[21] Appl. No.: 107,290

[22] Filed: Dec. 26, 1979

Related U.S. Application Data

[62] Division of Ser. No. 947,908, Oct. 2, 1978, Pat. No. 4,238,662.

[51] Int. Cl.³ .............................................. H01G 7/00
[52] U.S. Cl. .................................. 361/283; 361/271; 361/278
[58] Field of Search ............... 361/283, 280, 278, 271; 73/718, 724

[56] References Cited

U.S. PATENT DOCUMENTS

| | | | |
|---|---|---|---|
| 3,402,448 | 9/1968 | Heath | 361/271 |
| 4,064,550 | 12/1977 | Dias | 361/283 |
| 4,158,217 | 6/1979 | Bell | 361/283 |

FOREIGN PATENT DOCUMENTS 262272 12/1926 United Kingdom ................ 361/271

*Primary Examiner*—Elliot A. Goldberg
*Attorney, Agent, or Firm*—Markell Seitzman; Russel C. Wells

[57] ABSTRACT

A pressure-sensing capacitor and a method for trimming the capacitor is disclosed. The capacitor includes a pair of spaced flexible parallel quartz plates. A thin circular layer of conductive metal is formed on the opposing inner surfaces of the plates to define the electrodes of the capacitor. A glass frit sealing compound, forming a concentric ring about the conductive layers, is disposed between the plates to seal the evacuated space between the plates. The thickness of the ring is small enough so that the capacitance between the electrodes is higher by an unknown amount than the desired value of capacitance at every point in the range of variation of the value of pressure. The capacitor is trimmed by first measuring the capacitance value at zero pressure and also at a maximum pressure. The size and location of a path on one of the electrodes is computed from the measured capacitance values and the deflection characteristics of the plates. A point on the inner surface of one of the flexible plates moves a maximum perpendicular distance towards the other plate under pressure. That point defines a maximum deflection point along a deflection axis perpendicular to the inner surface at the maximum deflection point. Radiant energy in the form of a laser beam is applied to the electrode to cut through the electrode along the computed path which is closed on itself to define a disc eccentrically spaced a calculated distance from the deflection axis so that the value of capacitance at zero and the maximum pressure is substantially equal to the desired values.

5 Claims, 8 Drawing Figures

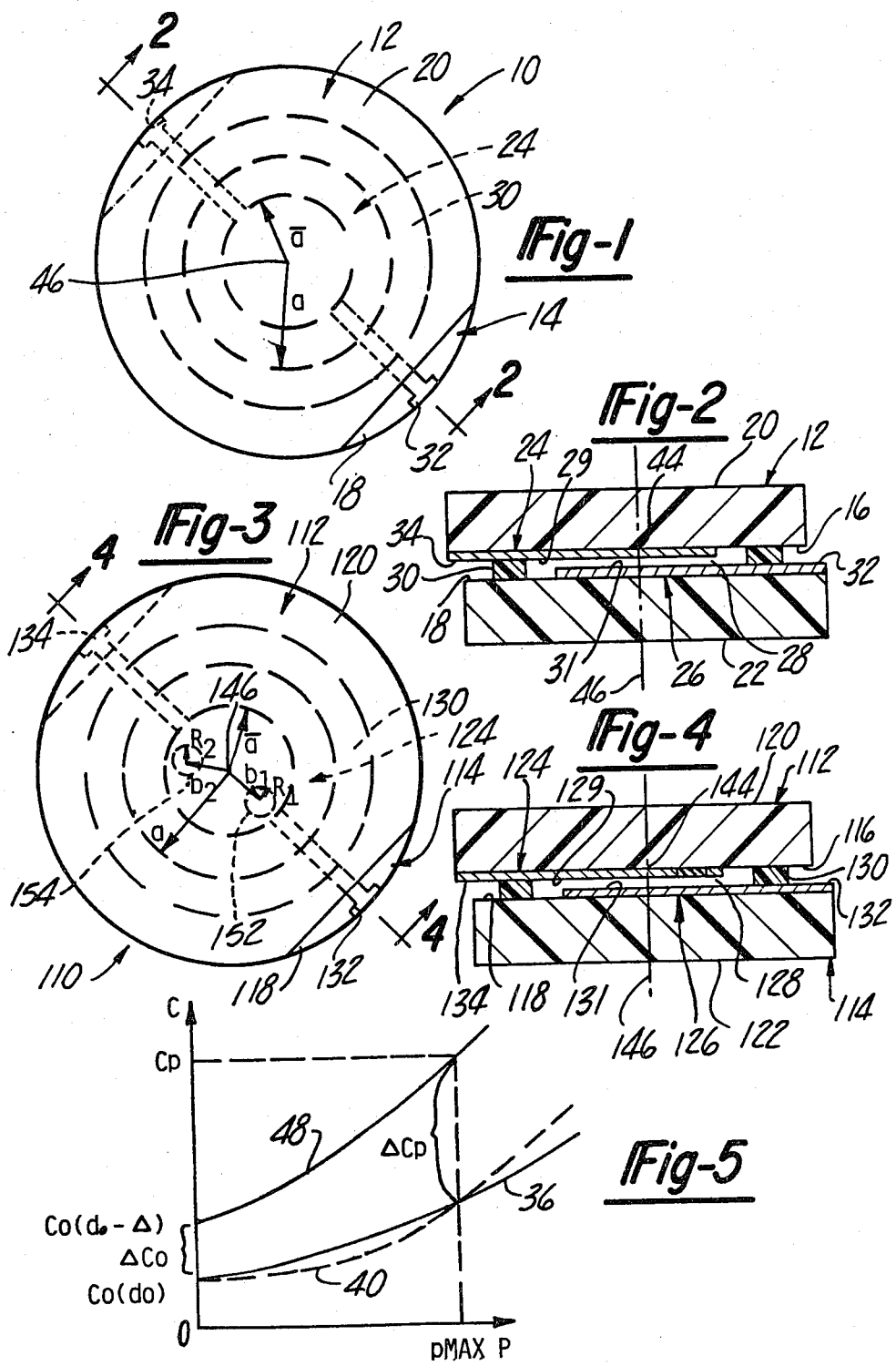

PRESSURE SENSING CAPACITIVE TRANSDUCER

This is a division of application Ser. No. 947,908, filed Oct. 2, 1978 now U.S. Pat. No. 4,238,662 issued Dec. 9, 1980.

TECHNICAL FIELD

This invention relates to capacitors and a method for trimming same and in particular to pressure sensing capacitors and the method for trimming same using radiant energy.

BACKGROUND ART

It has become increasingly important to provide accurate measurements of various parameters such as pressure. One area in which such measurement of pressure is important is the intake manifold pressure which represents an engine fuel demand parameter as shown in the U.S. patent application Ser. No. 881,321 entitled Microprocessor Based Electronic Engine Control System, filed Sept. 27, 1977 and having the same assignee as the subject application.

In the manufacture of a large number of capacitors or, in particular, pressure sensing capacitors or sensors, it is extremely difficult to control all of the parameters with sufficient accuracy to obtain the required capacitance value for each capacitor manufactured. This is particularly true when high precision capacitors are required. As a result, it is either necessary to discard large numbers of capacitors because they do not meet the specified tolerances or to trim the capacitors to value.

The U.S. Pat. No. 3,597,579 to Lumley shows a laser trimming technique for capacitors involving adjusting the effective area of an electrode by applying radiant energy to the electrode. An electrical potential is applied across the electrodes of the capacitor while the radiant energy is applied thereto to inhibit the formation of electrical shorts.

The trimming of a pressure-sensing capacitor is complicated by the fact that the capacitance value of the capacitor varies with pressure. Therefore any trimming of pressure sensing capacitors must allow for reproducible sensor performance through a range of pressures to eliminate or substantially reduce the need for complete calibration of individual sensors.

U.S. Pat. No. 3,750,476 to Brown, issued Aug. 7, 1973 discloses a pressure transducer comprising a pair of sealed members uniformly spaced and coated with an electrically conductive material to define a pair of plates in a capacitor. The U.S. Pat. No. 3,858,097 to Polye issued Dec. 13, 1974 discloses a pressure sensing capacitor comprising a hollow body having spaced opposing walls supported at their edges with electrical conducting means formed on deflecting portions of the wall. Other capacitor pressure transducers are shown in U.S. Pat. Nos. 3,634,727, 3,715,638 and 3,753,373.

CROSS REFERENCE TO RELATED APPLICATION

Filed concurrently herewith is a patent application identified as P-313 by Peter Fritz Braunlich entitled "Pressure-Sensing Capacitor and Method of Trimming Same" and now U.S. Pat. No. 4,238,661 having a common assignee as the subject application. The Braunlich application discloses a pressure-sensing capacitor and method wherein a concentric portion is trimmed from the capacitor's electrode.

DISCLOSURE OF THE INVENTION

An object of the present invention is to provide a variable capacitor having first and second spaced conductive plates, the first plate having a thin sheet of conductive material supported thereon a non-conductive substrate, the first plate being movable relative to the second plate in a known fashion in response to changes in the value of a variable physical quantity wherein a first portion of the first plate moves a greater distance than any other portion of the first plate at every point in the range of variation of the value of the physical quantity, and wherein a first part of the sheet is insulated from a second part of the sheet, the first part being located eccentrically on the non-conductive substrate with respect to a maximum deflection axis.

Another object of this invention is to provide a capacitor having first and second spaced conductive plates, the first and second plates being movable relative to each other along the deflection axis, having a thin sheet of conductive material supported thereon a non-conductive substrate and wherein at least two parts of the conductive sheet are insulated from another part of the sheet, and from each other and wherein a first insulated part and a second insulated part are both eccentrically located on the non-conductive substrate with respect to the maximum deflection axis.

A further object of the invention is to provide a method of making a variable capacitor having first and second spaced conductive plates, the first plate having a thin layer of conductive material supported theron a nonconductive substrate, the first and second plates being movable in a known fashion relative to each other in response to changes in the value of a variable physical quantity wherein the method includes the steps of measuring the capacitance values while subjecting the capacitor to two values of the variable physical quantity, computing the location and dimensions of a first part of the sheet relative to a maximum deflection axis according to a predetermined function of the measured capacitance values and the known displacement characteristics and cutting through the conductive sheet to sever the first part from a second part of the sheet such that the first part is eccentric with respect to the deflection axis.

Yet another object of the present invention is to provide a method of making a variable capacitor including cutting a first part and a third part of the conductive sheet formed from a second part, the location and dimensions of the first and third parts being calculated from two values of the measured capacitance and the deflection characteristics of the two conductive plates.

In carrying out the above objects and other objects of the invention, a preferred embodiment of the invention includes a variable capacitor of the type having a first conductive plate which is movable relative to a second conductive plate in accordance with known displacement characteristics at least one portion of the conductive sheet moving to a greater relative extent than a second portion of the conductive sheet along the deflection axis about which the deflection characteristics are symmetric in response to changes in the value of a variable physical quantity wherein the capacitor has a value of capacitance at every point in the range of variation of the value of the physical quantity whereby the capacitance value is a function of the physical quantity. The capacitor comprises first and second conductive plates disposed opposite each other and being spaced apart the first conductive plate comprising a conductive sheet supported on a non-conductive substrate, the conductive sheet including first and second parts which are insulated from each other. The first part of the conductive sheet is located eccentrically on the non-conductive substrate with respect to the deflection axis and is of such dimensions and location that the second conductive plate and the second part of the first conductive plate have a first predetermined value of capacitance therebetween when the capacitor is subjected to a first value of the physical quantity in the range of values. A second conductive plate and a second part of the first conductive plate of a second predetermined value of capacitance therebetween when the capacitor is subjected to a second value of the physical quantity within the range of values. The second conductive plate and the second part of the first conductive plate have a value of capacitance at every other point in the range of variation of the value of the physical quantity substantially equal to corresponding predetermined values of capacitance when the capacitor is subjected to the remaining values of the physical quantity within the range of values.

In further carrying out the above objects and other objects of this invention, a preferred method of making a variable capacitor of the type having a first conductive plate being formed of a conductive sheet supported on a non-conductive substrate and which is spaced from and disposed opposite a second conductive plate, the first conductive plate being movable relative to the second conductive plate in accordance with known displacement characteristics at least one portion of the conductive sheet moving to a greater relative extent than a second portion of the conductive sheet along the deflection axis about which the deflection characteristics are symmetric in response to changes in the value of a variable physical quantity such that the capacitance therebetween is higher by an unknown amount than the desired value of the capacitance at every point in the range of variation in the value of the physical quantity whereby the capacitance value is a function of the physical quantity. The method comprises the steps of measuring the capacitance value while subjecting the capacitor to a first predetermined value of the physical quantity, measuring the capacitance value while subjecting the capacitor to a second predetermined value of the physical quantity, computing the location and dimensions of a first part of the conductive sheet relative to the deflection axis according to a predetermined function of the measured capacitance values and said known displacement characteristics between the first and second conductive plates, the first part contributing an increment of capacitance between the plates having a value equal to the amount by which the measured capacitance exceeds the desired capacitance at the first and second predetermined values of the physical quantity. The method further comprises the step of cutting through the conductive sheet along a path defined by the location and dimensions of the first part from the conductive sheet such that the first part is eccentric with respect to the deflection axis to sever the first part from a second part of the sheet so that the value of capacitance between the second conductive plate and the second part of the conductive sheet is substantially equal to the desired value of capacitance when the capacitor is subjected to the first and second predetermined value of the physical quantity.

The objects, features and advantages of the present invention are readily apparent from the following detailed description of the best mode taken in connection with the accompanying drawings.

BRIEF DESCRIPTION OF THE DRAWINGS

FIG. 1 is a top plan view of a pressuresensing capacitor that need not be trimmed;

FIG. 2 is a sectional view of the capacitor taken along the line 2—2 of FIG. 1 with the thickness of the sealing compound and the conductive layers exaggerated for illustrative purposes;

FIG. 3 is a top plan view of a pressuresensing capacitor constructed according to the invention;

FIG. 4 is a sectional view of the pressuresensing capacitor taken along the line 4—4 of FIG. 3 with the thickness of the sealing compound and the conductive layers exaggerated for illustrative purposes;

FIG. 5 is a capacitance-pressure graph illustrating how the capacitance of the trimmed capacitor varies with externally applied pressure as indicated by the dotted line;

BEST MODE FOR CARRYING OUT THE INVENTION

Figure 6:
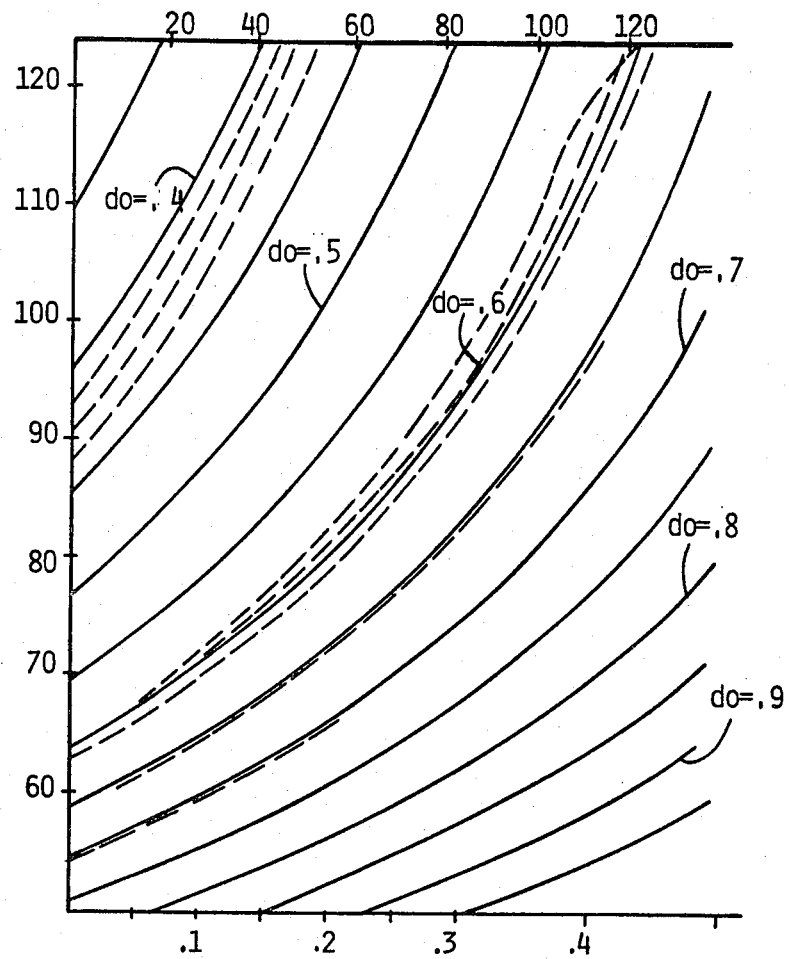
FIG. 6 is a capacitance-pressure graph illustrating how the capacitance of an untrimmed capacitor varies with externally applied pressure and with separation between the two plates.

A pressure-sensing capacitor, which has a capacitance substantially equal to a desired value of capacitance at every point in the range of variations of the value of pressure is generally indicated at 10 in FIGS. 1 and 2. The capacitor 10 includes a pair of spaced parallel plates 12 and 14. Each plate 12 and 14 is circular except for a small peripheral portion which has been removed from each plate 12 and 14, the purpose of which will become more apparent hereinafter. The plates 12 and 14 comprise polished fused transparent quartz or glass of substantially uniform thickness. The use of quartz is advantageous in that quartz is chemically inert so it will not corrode in adverse environments and, furthermore, quartz withstands considerable forces and compressions to measure high pressures and at the same time exhibits substantially no hysteresis characteristics when subjected to stresses or strains. Also, quartz has a very low temperature coefficient of expansion so that its response to pressures is substantially unaffected by changes in temperature.

Thin layers or sheets 24 and 26 of conductive material such as chromium metal, several thousand angstroms thick, are formed on the inner surfaces 16 and 18, respectively, by vacuum evaporation or sputtering such that the layers 24 and 26 are substantially identical in thickness and are substantially coaxial. The electrodes 24 and 26 are circular and are electrically insulated from each other by a space 28 which is evaporated in any well-known manner to form a vacuum.

When the capacitor is placed in a vacuum, the circular electrodes 24 and 26 have a capacitance given by $C_O = (\bar{a}+2)/4d_O$ [in egs units, 1 cm = 1/0.9 pF] wherein $\bar{a}$ is the radius of the circular electrodes 24 and 26 and $d_O$ is a perpendicular distance or separation between the two electrodes 24 and 26, due to the relative thinness of the metal electrodes 24 and 26, is also substantially the distance between the two plates 12 and 14.

In the preferred embodiment of this invention an electric insulator comprising a thin layer of $SiO_2$ (not shown) is formed at the opposing surfaces 29 and 31 of the electrodes 24 and 26 respectively and substantially covers the opposing surfaces 29 and 31. Preferably this layer is also several thousand angstroms thick and can be formed by using the same mask and vacuum evaporation technique as was used in depositing the chromium metal electrodes 24 and 26 on the inner surfaces 16 and 18.

The plates 12 and 14 are spaced apart a predetermined distance generally in the range of 0.1 to 1 millimeter by spacer means or a sealing member or ring 30 which maintains the separation $d_O$ in the area of the electrodes 24 and 26 immediately adjacent the sealing ring 30. Preferably the sealing ring 30 comprises a ring of glass frit disposed concentrically about the electrodes 24 and 26. The glass frit preferably comprises a borosilicate compound.

A conductor means or electrical leads 32 and 34 are integrally formed with the electrodes 26 and 24, respectively, on the inner surfaces 18 and 16 of the plates 14 and 12, respectively. The leads 32 and 34 are formed on non-overlapping portions of the plates 12 and 14 respectively to allow for easy electrical connection thereto. The leads 32 and 34 are integrally formed with the electrodes 26 and 24, respectively, at the same time the electrodes 24 and 26 are formed on the inner surfaces 16 and 18, respectively. That is, the leads 32 and 34 and their respective electrodes 26 and 24, comprise two chromium metal layers several thousand angstroms thick formed by vacuum evaporation or sputtering on the inner surfaces 18 and 16 of the plates 14 and 12, respectively.

During production of the pressure-sensing capacitor 10, the dimensions of the plates 12 and 14 can be kept relatively constant. However, the separation between the electrodes 24 and 26 differs from capacitor to capacitor due to variations in processing the sealing ring 30. It is desirable to produce pressure-sensing capacitors which have a substantially identical capacitance value when placed in a vacuum, $C_O$, as well as at a pressure which is the expected maximum operating pressure, $C(P_{max})$. In order to insure that $C_O$ is a constant value for an entire production run, a pressure-sensing capacitor as shown in FIGS. 3 and 4 is intentionally produced with a somewhat smaller than expected or calculated initial plate separation which can be represented by $d_O - \Delta$, wherein $d_O$ is the expected or calculated plate separation of the capacitor 10 and $\Delta$ varies because of the variation in processing the sealing material 30. In other words, the plate separation is purposely less than $d_O$, namely $d_O - \Delta$, so that the initial value of capacitance $C_O$ will be greater than desired. The capacitor 110 is structurally the same as the capacitor 10 before it is trimmed except the capacitor 110 has a plate separation of $d_O - \Delta$ and not $d_O$. In order to achieve a close match in capacitance of the capacitor 110 at the maximum pressure, $P_{max}$, as well as in a vacuum, the trimming must be done keeping in mind not only the amount of electrode are to be trimmed away, but also the location of the trimmed away electrode area must be carefully chosen as will be described in greater detail hereinafter with reference to FIG. 5.

Figure 8:
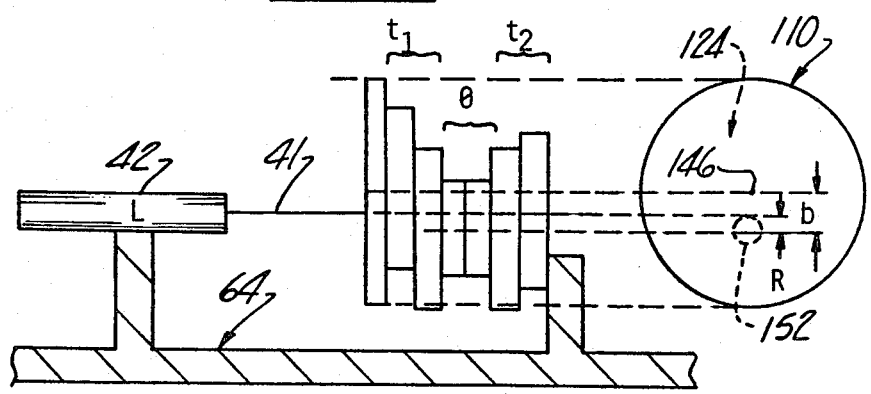
FIG. 8 shows in schematic form an apparatus for providing the mechanical motions necessary for trimming the capacitor.

In the preferred embodiment of the present invention the electrodes 124 and 126 are trimmed or cut by applying radiant energy in the form of a focused laser beam 41 emitted by a laser 42 as shown in FIG. 8 to the electrode 124 and through the quartz plate 112, of the capacitor 110. The trimming apparatus as shown in FIG. 8 will be described in greater detail hereinafter.

Although the discussion hereinafter describes the laser cutting of only the top electrode 124, it is to be understood that due to the closeness of the electrodes 124 and 126, the bottom electrode 126 may also be cut by the same focused beam 41 at the same time. For purposes of the following discussion, it is unimportant whether the bottom electrode 26 is also cut since the resultant change in capacitance by also cutting the bottom electrode 126 is insignificant here.

The laser 42 may comprise an Nd:Yag laser argon ion laser, or one similar which utilizes a sharply focused CW or pulsed laser beam at any wavelength between 3,000 angstroms and 15,000 angstroms. As a result, the width of the laser cuts in the electrode 124 can be smaller than 50 micrometers.

As in the case of the capacitor 10, the sealing ring 130 is concentrically formed about its circular electrodes 124 and 126. The sealing ring 130 which is disposed between the plates 112 and 114 maintains the distance $d_O - \Delta$ between the plates 112 and 114 immediately adjacent the sealing ring 130. Both of the capacitors 10 and 110 have a corresponding maximum deflection point 44 and 144 on the inner surfaces 16 and 116 on the flexible plates 12 and 112 each of which moves a maximum perpendicular distance towards its corresponding plates 14 and 114 when the plates 12 and 112 are subjected to pressure at its outer surface 20 and 120. Each of the maximum deflection points 44 and 144 lies along a corresponding deflection axis 46 and 146 which is perpendicular to the inner surfaces 16 and 116 of its corresponding upper plates 12 and 112. The corresponding centers of the metal electrodes 24 and 124 are coincident with the centers of the sealing rings 30 and 130 and also lie along their corresponding deflection axes 146. The centers of the metal electrodes 24 and 124 deflect more than any other point on the electrodes 24 and 124 towards the plates 14 and 114 when pressure is applied at the outer surfaces 20 and 120 of the plates 12 and 112.

Referring now to FIG. 5, curve 48 represents the pressure-capacitance characteristics of the capacitor 110 before trimming. The curve 36 represents the pressure capacitance characteristics of the ideally-constructed capacitor 10. The curve 40 represents the pressure-capacitance characteristics of the capacitor 110 after trimming according to the method of the instant invention.

As a general rule, the closer a trimmed portion or part of an electrode is to the perimeter of the circular electrode the less the characteristic curve of that trimmed capacitor varies from the curve 36 especially near $P_{max}$. Conversely, trimming a portion of an electrode closer to the center of the electrode will cause the characteristic curve of that trimmed capacitor to vary to a greater extent from the curve 36.

MATHEMATICAL BASIS FOR THE TRIMMING TECHNIQUE

The deflection under pressure of a pair of clamped plates such as sealed plates 12 and 14 as previously described is represented by the following equation:

$$y = 3WS(m^2-1)/16\pi E\, m^2 t^3 [1(a^2-r^2)^2/a^2] \qquad (1)$$

where
W = pressure
m = reciprocal of Poisson's ratio
a = glass frit inner radius (wherein $a = \bar{a}$ when the radius of the electrode equals the inner radius of the glass frit which is not the case here)
r = radial distance from the center of the electrode, having a deflection y
t = top and bottom plate thickness (assuming equal thickness)
E = Young's modulus
S = an empirically derived correction factor, between 1 and 5.14 (the upper limit is that of a simply supported plate; the correction factor compensates for the fact that the clamped plate model (i.e. the above equation without correction factor) only $$C = \frac{a^2}{2d_0} \int_0^{(R_1-b_1)/a} \frac{x\,dx}{1 - \frac{k}{d_0}(1-x^2)^2} + \frac{a^2}{4\pi d_0}$$

approximates the capacitor and will underestimate y. The correction factor is proportional to t if the frit width is greater than t; if less than t, it is inversely proportional to the frit width.)

Maximum deflection of the plates 12 and 112, 14 and 214 is at the common center of their respective electrodes 24 and 124, 26 and 126 along the deflection axes 46 and 146 wherein r = zero. The deflection ratio of any point $r \neq 0$ to the deflection of the center (r=0) is $Y/y_{max} = 1(a^2-r^2)^2/a^4$. For example, given that the fused quartz plates 12 and 14 are two inches in diameter and are clamped over an inflexible sealing ring of 1.5 inch inner diameter, the center of the plate 12 deflects at full load as follows, $Y(0) = 0.15334$ millimeters, for $t = 1/16''$; $y(0) = 0.0417$ millimeters, for $t = 1/18''$; and $y(0) = 0.0052$ millimeters, for $t = 1/4''$.

Instead of determining the radii $a_1$ and $a_2$ for trimming the electrode 124 as shown in the above-noted application and performing the described trimming operations (some of which are relatively difficult and time consuming radial cuts), an eccentric disc 152 is trimmed from the electrode 124 as shown in FIG. 3. The disc 152 is eccentric in that its center does not coincide with the center of the electrode 124 which lies along the axis 146. The capacitance of the disc 152 (in cgs. units) to be trimmed out is given by the equation:

$$C = \frac{1}{4\pi} \int dr\, d\theta \int \frac{r}{d_0 - y_1 - y_2} \qquad (2)$$

wherein $y_1$ and $y_2$ are the upper and lower plate deflections as given by the above deflection equation (1) and r and $\theta$ are the polar coordinates.

Letting $k = \frac{3WS(m^2-1)a^4}{16\pi E\, m^2 t^3}$ and $x = r/a$ the disc capacitance equation (2) can be re-expressed as:

$$C = \frac{a^2}{4\pi d_0} \int_{b_1 - R_1/a}^{(b_1+R_1)/a} \frac{x\,dx}{1 - \frac{k}{d_0}(1-x^2)^2} \cos^{-1}\frac{(ax)^2 - b_1^2 - R^2}{2xb_1 a} \qquad (3)$$

wherein $R \leq b_1$, and wherein $b_1$ and $R_1$ are parameters that characterize the disc 152. $R_1$ is the radius of the disc 152 and $b_1$ is the distance between the electrode and disc centers. From the amount of excess capacitance at zero pressure, the area of the disc 152 or parameter R can be determined. This is the adjustment at zero pressure or $\Delta C_O$, the "zero adjustment" as shown in FIG. 5. For a given $R_1$, the disc capacitance at $P_{max}$ will be different, depending on the disc location $b_1$. As previously noted, the disc capacitance at $P_{max}$ for a given $R_1$ will be at a maximum for $b_1 = 0$. As $b_1$ increases, the disc capacitance at $P_{max}$ decreases. Thus the excess capacitance at $P = P_{max}$ determines $b_1$. This can be termed a "span" adjustment or $\Delta C_P$ as shown in FIG. 5.

If $R_1 > b_1$, the disc capacitance equation (2) is re-expressed as $$\int_{(R_1-b_1)/a}^{(R_1+b_1)/a} \frac{x\,dx}{1 - \frac{k}{d_0}(1-x^2)^2} \cos^{-1}\frac{(ax)^2 + b_1^2 - R_1^2}{2xb_1 a} \qquad (4)$$

The determination of a particular $R_1$ and $b_1$ will now be illustrated by way of example.

Referring now to FIG. 5 $C_O(d_O - \Delta)$ is readily measured in a vacuum. The quantity $d_O - \Delta$ is determined by the equation $$C_O(d_O - \Delta) = (\bar{a}^2)/d_O - \Delta$$

The value of $d_O$ is determined from the equation $C_O(d_O) = \bar{a}^2/d_O$ wherein $C_O(d_O)$ is the desired capacitance of the capacitor 110 at zero pressure.

With $a = 0.34''$ and $\bar{a} = 0.2325''$, $P_{max} = 100$ psi and $t = 0.062''$ and $b_1 = 0$, Equation 4 is used to calculate the untrimmed capacitance as a function of $d_O$ and Y(0), the total center deflection of both plates 112 and 114. Y(0) is linearly proportional to pressure P as shown in equation (1) if S is independent of P. FIG. 6 shows the calculated capacitance of the untrimmed device as a function of $d_O$ and Y(0) in the solid lines while the dotted lines show corresponding experimental data. The clamped plate model is seen to describe the classic behavior of the sensor device 10 with a high degree of accuracy. The correction factor.S, in this example is relatively independent of pressure and is determined to equal 1.8191 in the instant case. The pressure is indicated at the top of FIG. 6 for cross-reference.

Figure 7:
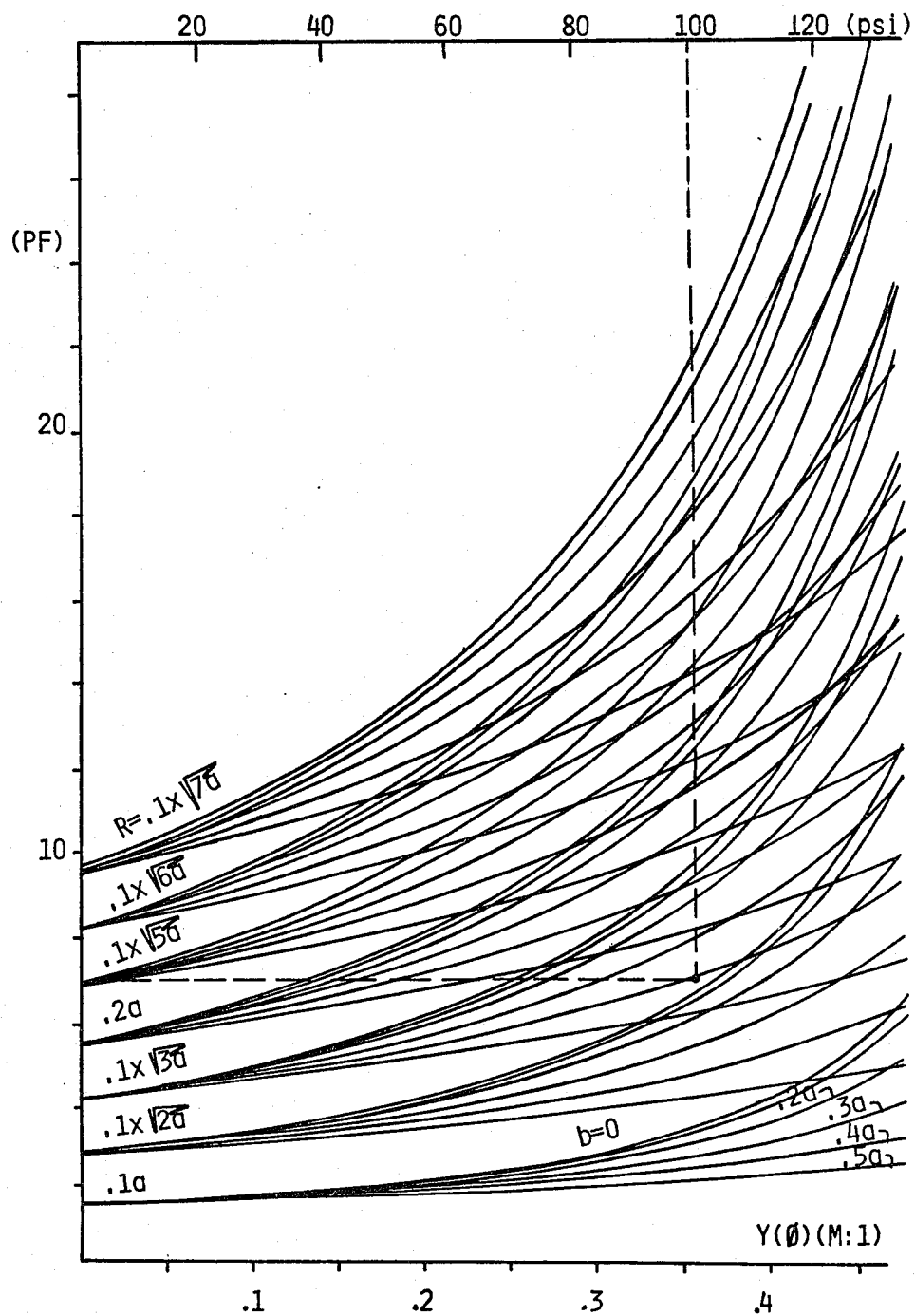
FIG. 7 is a capacitance-pressure graph illustrating how the capacitance of an untrimmed capacitor varies with externally applied pressure and with two parameters which characterize a disc trimmed from an electrode of the capacitor.

After $d_O$ is determined (i.e. by knowledge of the capacitance at zero pressure and with reference to FIG. 6) Equations (3) and (4) are used to calculate the disc capacitance as a function of $R_1$ and $b_1$. Assuming $d_O = 0.6$ mil., $R_1$ and $b_1$ can be determined from the plotted calculated disc capacitance for various values of $R_1$ and $b_1$ as shown in FIG. 7. The different families of curves correspond to a different $R_1$. Within one family, the parameter $b_1$ is varied. As previously noted, as $b_1$ increases, the disc 152 approaches the edge of the electrode 124. The capacitance of the disc 152 therefore becomes decreasingly sensitive to pressure.

Assuming the excess capacitance to be trimmed off is 4pF at zero pressure and 7pF at 100 psi, FIG. 7 shows that a curve having $R_1 = 1\sqrt{3}$ a and $b_1 = 0.4a$ gives the desired capacitance at these two points.

If $R_1 + b_1 > \bar{a}$, this would imply that part of the disc 152 to be trimmed would lie outside the boundary of the electrode 124. One solution to the problem is to cut an additional disc or discs such as disc 154 having an $R_2$ and a $b_2$ equal to the $R_1$ and $b_1$, respectively of the disc 152. Depending on the values of the excess capacitance, the capacitance can be reduced by a factor of integer n (n > 1), redetermining $R_1$ and $b_1$, and trimming of n discs of the same $R_1$ and $b_1$.

A computer program written in a "basic" language designed for use is a Hewlett-Packard 98-25 calculating machine is provided in the Appendix for determining the R and b of N discs to be eliminated or trimmed from the electrode area.

The procedure described above makes it possible to trim a capacitor such as the capacitor 110 shown in FIGS. 3 and 4 to desired capacitances at two chosen pressure points (i.e. 0 and 100 psi in the present case). If two capacitors having different values of $d_O - \Delta$ are trimmed to agree with each other at the two pressure points, it is to be expected that they would differ slightly at other pressure points. There may be instances where agreement in the intermediate pressure points is also needed. It is possible to make the capacitors agree with each other at 2N pressure points if N discs are trimmed from the capacitor. While not described herein a capacitor having N discs cut therefrom, the disc having N different b's and N different R's would provide the 2N degrees of freedom needed to make the curves agree at 2N points.

TRIMMING TECHNIQUE

The method and apparatus for trimming the capacitor 110 as shown in FIGS. 3 and 4 will now be described with reference to FIG. 8. The assembly as shown in FIG. 8 includes an argon ion laser 42 which is preferably a Spectra Physics Model 164 argon ion laser mounted on the base 64. The radiant energy emitted by the laser 42 is focused by a lens (not shown). The assembly includes two translational stages $t_1$ and $t_2$, and a rotational stage $\theta$. The laser 42 operates in a continuous or fast pulse mode while delivering sufficient energy to a focal spot of minimal size as previously described.

A capacitor such as the capacitor 110 is centered on $t_1$ shown in its upright position. The setting of stage $t_2$ corresponds to radius $R_1$ or $R_2$ while that of stage $t_1$ corresponds to $b_1$ or $b_2$. During actual trimming after $t_1$ and $t_2$ are set at the desired values $\theta$ is turned a full revolution for a circular disc 152 or 154 to be trimmed from the electrode 124 by making a complete cut therethrough with the laser beam 41.

As a result of the described laser trimming process large volume production of capacitors is possible without the need for complete calibration of the individual capacitors which have different initial plate separations (i.e. $d_O - \Delta$ where $\Delta$ is an unknown value is allowed to vary) but are otherwise identical in their physical dimensions. The determination of $R_1$ and $b_1$, and possibly other R's and b's, for example, by means of computer calculations are sufficient to permit laser trimming so that the capacitor's characteristic capacitance-pressure curve falls within a narrow band, or, in other words, closely follows the desired characteristic capacitance-pressure curve. In fact, the trimming process described above lends itself readily to computer control. The expressions for $R_1$ and $b_1$ could be incorporated into a computer trimming program. The computer would then control measurement of untrimmed capacitance, compare it with the desired response or target curve, evaluate $R_1$ and $b_1$ and activate the trimming hardware.

While the preferred embodiment of the capacitor 110 and the method of trimming the capacitor 110 have been shown and described herein in detail those skilled in this art will recognize various alternative designs and embodiments for practicing the present invention as defined by the following claims.

APPENDIX

The computer program works as follows.
The inputs are
A = Frit inner radius in inches
r = Electrode radius as a fraction of A
$C_{zero}$ = Capacitance between the two electrodes at zero pressure in micro farads
$delC_O$ = The amount of zero pressure capacitance to be eliminated
$C_p$ = Capacitance between the two electrodes at the pressure at which a frit is required
$delC_p$ = The amount of capacitance at that pressure to be eliminated.
N = Number of discs to be eliminated
The program calculates r and b by iteration.
The outputs are
d = frit thickness in inches
r = radius of discs to be eliminated in inches
b = distance from center of disc to center of electrode in inches
$delC_p$ = final $delC_p$ reached at end of iteration

```
0:  rad;fxd7
1:  dim W[8], X[8]
2:  "start":ent "A )inch)", A, "elect r (in A)", S,
    "Czero", C, "del Co", r10
3:  s→r8
4:  ent "Cp",E,"del Cp", r11, #disc", N
5:  "rep":fxd 4; prt"# Discs=",N
6:  fd 7
7:  r10/N→L;r11/N→H
8:  A*8*r8*A*2.54/(4*C*.9)→D
9:  A*r8*√(L/C)→R
10: prt "d(in)", D, "r(in)",R
11: r8→S
12: 0→I
```

```
13: .1894506104→W[ 1]
14: .18260341.5→W[ 2]
15: .1691565193→W[ 3]
16: .1495959888→W[ 4]
17: .1246289712→W[ 5]
18: .0951585116→W[ 6]
19: .0622535239→W[ 7]
20: .0271524594→W[ 8]
21: .0950125098→X[ 1]
22: .2816035507→X[ 2]
23: .4580167776→X[ 3]
24: .6178762444→X[ 4]
25: .7554044083→X[ 5]
26: .8656312023→X[ 6]
27: .944575023→X[ 7]
28: .9894009349→X[ 8]
29: 0→B; .03→P; 0→T;C→r1
30: "ITR":0→G
31: for K=1 to 8
32: X[K]→Y
33: gsb "sub1"
34: G+W[ K]*F→G
35: -Y→Y
36: gsb "sub1"
37: G+W[ K]*F→G
38: next K
39: 3*A*A*2.54/(2*π*D*.9)→G
40: P→V;G→r2
41: if abs (G-E)>.01;jmp 3
42: (E-r1)*(V-T)/(r2-r1)+T→P
43: r2→r1; V→T; gto "ITR"
44: prt "Y(%d)", P, "cp(pf)",G
45: R/A→S
46: 0→B;gsb "sub0"
47: .2→r9
48: 0→T;r9→V;G→r1;9→B
49: "ITB":0→G ;gsb "sub0"
50: G →r2
51: if abs (r2-H)<.01;jmp 3
52: (H-r1)* (V-T)/(r2-r1)+T→B
53: r2→r1;V→T; B→V;gto "ITB"
54: prt "b (in)",A*B,"delCp",N*G
55: if R>A*B; if N>1;gto "in"
56: jmp 2
57: "in":prt "overlap"
58: if R+A*B> r8*A; gto "out"
59: prt "sol 'n in range";jmp 3
60: "out":prt "sol'n out range"
61: N+1→N;gto "rep"
62: stp
63: "sub0:0→G for L=1 to 8
64: X[K]→Y
65: gsb"sub1"
66: G&W[ K]*F→G
67: -Y→Y
68: gsb "sub1"
69: G+W[ K]*F→G
70: next K
71: 3*A*A*2.54/(2*π*D*.9)→G
72: ret
73: "sub1":S*Y+B→Q
74: Q*S/(1-P*(1-Q*Q)↑2)→F
75: Q+B-S→U
76: if U>0; tog "arc"
77: if Q<0;0→F
78: F*π→F;ret
79: "arc":F*acs((Q*Q+B*B-S*S)/2*B*Q))→F
80: ret
81: end
*11654
```

What is claimed is:

1. In a capacitive pressure transducer of the type comprising:

first and second oppositely situated, parallel, insulative, flexible plates separated by a peripheral sealing means for forming an internal chamber therebetween, and defining pressure responsive regions in said first plate and said second plate in the areas of said plates interior to said sealing means, said plates deflecting in response to pressure applied thereto;

conductive means located on said plates within said internal chamber for forming the conducting surfaces of a pressure sensitive capacitor and for generating a capacitive signal indicative of said applied pressure, said capacitor defining a first value of capacitance at a determinable first level of applied pressure and a second value of capacitance at a determinable second level of applied pressure, wherein the first value and the second value exceed by a determinable amount the desired value of capacitance at said first and at said second pressure levels and wherein said conductive means includes a first and second conductive layer or electrode each respectively applied to the inside portion of one of said plates and located apart from and coaxial to said sealing means;

said first electrode includes at least one eccentrically located hole, such that the center of said hole is situated a distance b from the center of said first electrode, and wherein the area A of said hole is chosen to reduce said first value of capacitance to the desired value at said first level of applied pressure and wherein the distance b is chosen to reduce said second value of capacitance at said second level of applied pressure.

2. The transducer as defined in claim 1 wherein said hole is circular having a radius r.

3. The transducer as defined in claim 2 wherein said first electrode comprises a plurality of said holes.

4. The transducer as defined in claim 3 wherein said holes are located at different distances from the center of said first electrode.

5. The transducer as defined in claim 3 or 4 wherein said internal chamber is maintained at a predetermined level of vacuum pressure.

* * * * *